(12) United States Patent
Possanza et al.

(10) Patent No.: US 6,648,943 B2
(45) Date of Patent: Nov. 18, 2003

(54) INTEGRATED USE OF DEAERATION METHODS TO REDUCE BUBBLES AND LIQUID WASTE

(75) Inventors: Steven D. Possanza, Penfield, NY (US); Angela H. Jones, Rochester, NY (US); Christoph H. Seeling, Kew (AU)

(73) Assignee: Eastman Kodak Company, Rochester, NY (US)

( * ) Notice: Subject to any disclaimer, the term of this patent is extended or adjusted under 35 U.S.C. 154(b) by 59 days.

(21) Appl. No.: 10/027,288

(22) Filed: Dec. 21, 2001

(65) Prior Publication Data

US 2003/0116014 A1 Jun. 26, 2003

(51) Int. Cl.⁷ .............................................. B01D 19/00
(52) U.S. Cl. ............................................ 95/30; 96/175
(58) Field of Search ............................. 95/30; 96/175; 210/188

(56) References Cited

U.S. PATENT DOCUMENTS

| | | | |
|---|---|---|---|
| 2,620,894 A | * 12/1952 | Peterson et al. |
| 3,239,998 A | 3/1966 | Carter et al. |
| 3,284,991 A | * 11/1966 | Ploeger et al. |
| 3,432,691 A | 3/1969 | Show |
| 3,793,805 A | * 2/1974 | Hoffman |
| 3,853,500 A | * 12/1974 | Gassmann et al. |
| 3,904,392 A | 9/1975 | VanIngen et al. |
| 4,070,167 A | 1/1978 | Barbee et al. |
| 4,127,394 A | * 11/1978 | Verhille |
| 4,205,966 A | * 6/1980 | Horikawa |
| 4,398,925 A | 8/1983 | Trinh et al. |
| 4,428,757 A | * 1/1984 | Hall |
| 4,612,018 A | * 9/1986 | Tsuboi et al. |
| 4,935,151 A | * 6/1990 | Do |
| 5,372,634 A | 12/1994 | Monahan |
| 5,373,212 A | 12/1994 | Beau |
| 5,834,625 A | 11/1998 | Kraus, Jr. et al. |
| 5,853,456 A | 12/1998 | Bryan et al. |
| 6,053,028 A | 4/2000 | Kraus, Jr. et al. |
| 6,106,590 A | * 8/2000 | Ueno et al. |
| 2003/0047067 A1 | * 3/2003 | Kraus et al. |
| 2003/0061939 A1 | * 4/2003 | Hutton et al. |

FOREIGN PATENT DOCUMENTS

| | | |
|---|---|---|
| GB | 2191420 | * 12/1987 |
| JP | 63-178807 | * 7/1988 |
| JP | 1-199607 | * 8/1989 |
| JP | 5-92103 | * 4/1993 |

* cited by examiner

Primary Examiner—Duane S. Smith
(74) Attorney, Agent, or Firm—Mark G. Bocchetti

(57) ABSTRACT

A method is taught for removing bubbles from a coating solution prior to a coating operation. The method comprises debubbling the coating solution in a tank open to atmosphere to remove bubbles having a diameter in the range of from about 200 to 300 μm and greater therefrom; flowing the coating solution from the tank to a bubble elimination tube; debubbling the coating solution in the bubble elimination tube to remove bubbles from the coating solution having a diameter greater than about 200 μm, the bubble elimination tube preferably including at least one ultrasonic horn; flowing the coating solution from the bubble elimination tube through an end cap round ultrasonic bubble eliminator, the end cap round ultrasonic bubble eliminator removing remaining bubbles in the coating solution having a diameter greater than about 30 μm; and delivering the coating solution from the end cap round ultrasonic bubble eliminator to the downstream coating operation.

4 Claims, 4 Drawing Sheets

INTEGRATED USE OF DEAERATION METHODS TO REDUCE BUBBLES AND LIQUID WASTE

FIELD OF THE INVENTION

The present invention relates generally to methods and apparatus for removing entrained gas bubbles from a liquid and; more particularly, to methods and apparatus for deaerating the liquid in stages to prevent downstream operation manufacturing defects that can occur as a result of inadequate bubble removal.

BACKGROUND OF THE INVENTION

There are a variety of emulsions, suspensions, pastes, and high viscosity liquids used in the manufacture of or which become part of a variety of products in the chemical, pharmaceutical, food product, and photographic industries. These emulsions, suspensions, pastes, and high viscosity liquids often contain entrained air or gases present in the form of small bubbles. Often this air or gas, particularly in the case of entrained bubbles, is detrimental to the final product being produced. For example, in the case of photographic emulsions containing bubbles, the quality of the films or photographic papers produced is greatly impaired, giving rise to coated defects making the photographic materials unusable.

It is known to remove gas bubbles from solutions, emulsions, and other liquid compositions by exposing them to an imposed ultrasonic energy field. In such an energy field, large entrained gas bubbles are caused to coalesce and rise into a gas trap. Small bubbles may be collapsed and the gas driven into solution, depending upon the size of the bubble and the degree of gas saturation of the liquid composition. Apparatus for debubbling generally includes a metal vessel or tube containing a metal horn extending through an end wall of the vessel; one or more crystal transducers resonantly responsive to an imposed ultrasonic RF signal and bonded and/or bolted to the external end of the horn; and an RF signal generator of the proper frequency. Typically, debubbling apparatus in the art of preparing photographic emulsions are operated at ultrasonic frequencies between 25 kHz and 40 kHz.

An apparatus which is typically used in the photographic industry for de-bubbling photographic emulsions is an end cap round ultrasonic bubble eliminator, typically referred to as an ECR. The ECR includes a transducer horn assembly (hereinafter referred to as a "THA") which is an electromechanical device that converts electrical vibration to mechanical vibration. One particular ECR, with its component THA, is taught in U.S. Pat. No. 5,373,212 to Beau, hereby incorporated herein by reference. In the operation of an ECR, an alternating voltage is applied to a ceramic disc of the THA, which, as a result, generates mechanical vibration. This mechanical vibration assists in the debubbling of the photographic emulsions flowing through the ECR. Beau teaches a debubbling device wherein an ultrasonic power supply regulates power output to a predetermined constant level. The output of the generator is automatically adjusted to maintain a nominal power level, for example, 40 watts, in the face of changing load conditions that would otherwise cause the power to change in the absence of this feature. This is referred to in the prior art as a "constant power" setting of the generator.

U.S. Pat. No. 5,853,456 to Bryan et al, hereby incorporated herein by reference, discloses a debubbling device suitable for use in debubbling photographic compositions.

The use of ultrasonics in the debubbling or deaeration of liquids is widespread. For example, U.S. Pat. No. 3,239,998 to Carter et al. uses ultrasonics to debubble multiple liquids simultaneously, while U.S. Pat. No. 5,834,625 to Kraus Jr. et al. describes removing air from a discrete sample of liquid using ultrasonics. Other, more simplistic but similar techniques employing a vessel and ultrasonic transducer(s) propose operation under a slight vacuum pressure, allowing trapped gas to be removed from a single solution. Such techniques are taught in U.S. Pat. No. 3,904,392 to Van Ingen et al., U.S. Pat. No. 4,070,167 to Barbee et al., and U.S. Pat. No. 5,372,634 to Monahan.

The vacuum technique, while apparently quite popular, does not appear to assist greatly in bubble removal, and its effectiveness is significantly reduced when dealing with more viscous solutions.

U.S. Pat. No. 4,070,167 to Barbee et al. describes an apparatus with a single ultrasonic transducer placed in the vertical position beneath a horizontal tubular vessel. The apparatus has a fairly complicated recycle stage which includes a further compartment with ultrasonics, typically operated under positive pressure. This setup is quite cumbersome, and there are inherent difficulties both in operation and cleanability of the apparatus in such an arrangement.

In devices which use ultrasonics for debubbling, the acoustic forces emanating from the transducers aid in the separation of gaseous bubbles from solution, as they assist the upward buoyancy force in opposing the downward drag force of the bubbles in solution. This phenomenon has been commonly used in the debubbling of flowing solutions (e.g. U.S. Pat. No. 3,904,392 to Van Ingen et al., U.S. Pat. No. 4,070,167 to Barbee et al., U.S. Pat. No. 5,373,212 to Beau, U.S. Pat. No. 4,398,925 to Trinh et al.).

Because the removal of bubbles from flowing liquids can be critical to the quality of the products made with such liquids and the speed at which such products can be made, increasing the effectiveness of a bubble elimination device is always desirable. Bubbles in solution (in the form of entrained air) are a reality of the modern high-speed methods to coat complex photographic films and papers. If not removed prior to coating, bubbles are a major source of machine down time and coated waste. A single bubble, 30 $\mu$m or larger, can cause a coated defect and should be avoided.

Bubbles are introduced into coating solutions, particularly photographic coating solutions in a variety of ways. Bubbles may be introduced directly into the many components used in the various stages of preparation (dissolved, entrained or in voids) of the coating solution before it is delivered to the coating apparatus. Bubbles may also be introduced as result of the mixing process used to create the coating solution itself. Further, bubbles may result from dissolved gases in the coating solution that are released due to changes in pressure and/or temperature. Also, in the preparation of photographic coating solutions, as components are "melted" from the solid to liquid state, dissolved gases may be released therefrom. As a result, bubbles must be effectively dealt with for an efficient coating process.

The manufacture of complex film and paper photographic products requires the assembly of hundreds of components, high shear agitation, multiple phase changes and many pressure and temperature gradients. All of these factors result in an ideal situation for the formation and maintenance of bubbles entrained in the coating solution. As a result, just prior to coating, the bubbles must be removed. Typically, efforts to effectively remove bubbles from the coating solution have concentrated on enlarging the capacity of the existing deaeration devices, on increasing the time or number of purges prior to coating operation start-up which results, most particularly, in increasing liquid waste.

SUMMARY OF THE INVENTION

It is therefore an object of the present invention to provide a staged or graduated method of bubble elimination that effectively removes bubbles from the coating solution.

It is a further object of the present invention to provide a staged or graduated method of bubble elimination that obviates generation of excessive coating solution waste.

Briefly stated, the foregoing and numerous other features, objects and advantages of the present invention will become readily apparent upon a review of the detailed description, claims and drawings set forth herein. These features, objects and advantages are accomplished by removing bubbles from solution by performing primary deaeration of the coating solution in two stages. The first stage of primary deaeration is performed in a kettle or open tank to remove large bubbles (200–300+ microns) and high levels of entrained air (0.1 to 1 percent by volume). This can be accomplished by holding the solution at coating temperature for an hour or so in an open tank or kettle with minimal agitation. Mixer speeds are optimized with level and hold time. The large bubbles (500+ microns) rapidly rise out of solution and vent to atmosphere. With slow agitation, the surface of the solution is turned over and bubble removal is enhanced. The second stage of primary deaeration is accomplished in a smaller tank called a Bubble Elimination Tube (BET). The BET is typically a 6 or 8 inch diameter horizontal cylinder that is 60% filled with the coating solution. Coating solution enters one end of the tube and exits at the bottom of the opposite end of the tube after the solution has been "treated" for bubbles. The treatment may consist of simple buoyancy, or the coating solution may be treated with one or two ultrasonic horns to aid in driving the bubbles to the liquid/air interface within the tube. The treatment depends on the amount of air in the coating solution and the flow rate and viscosity of the coating solution. As the solution exits the BET, entrained air is typically less than 0.05 percent by volume and bubbles larger than 200 $\mu$m have been removed. Optimization of this portion of the process may include adjusting the volume of coating solution in the BET, the power levels at which the ultrasonic horns are operated, BET tank design, or the number of ultrasonic horns in the BET. After second stage primary deaeration is completed in the BET, the coating solution exiting the BET is pumped under pressure into an ECR. The ECR is generally a vertical 3-inch diameter cylinder. Solution enters the top and passes past another ultrasonic horn before exiting the bottom of the ECR. Two processes occur in the ECR. First, the horn forces bubbles to the top of the housing or cylinder. Second, bubbles are dissolved into solution under pressure and effectively removed from the coating solution. Since the bubbles are very small and few in number at this point, they typically stay dissolved in solution through the coating process. Dissolved gases are not an issue in generating coating defects. Coating solution exiting the ECR has negligible entrained air and contains bubbles that are effectively too small (less than 30 microns) to measure.

By using the various devices in an integrated and optimum method, overall deaeration is enhanced without increases in liquid waste or capital cost.

DETAILED DESCRIPTION OF THE INVENTION

Figure 1:
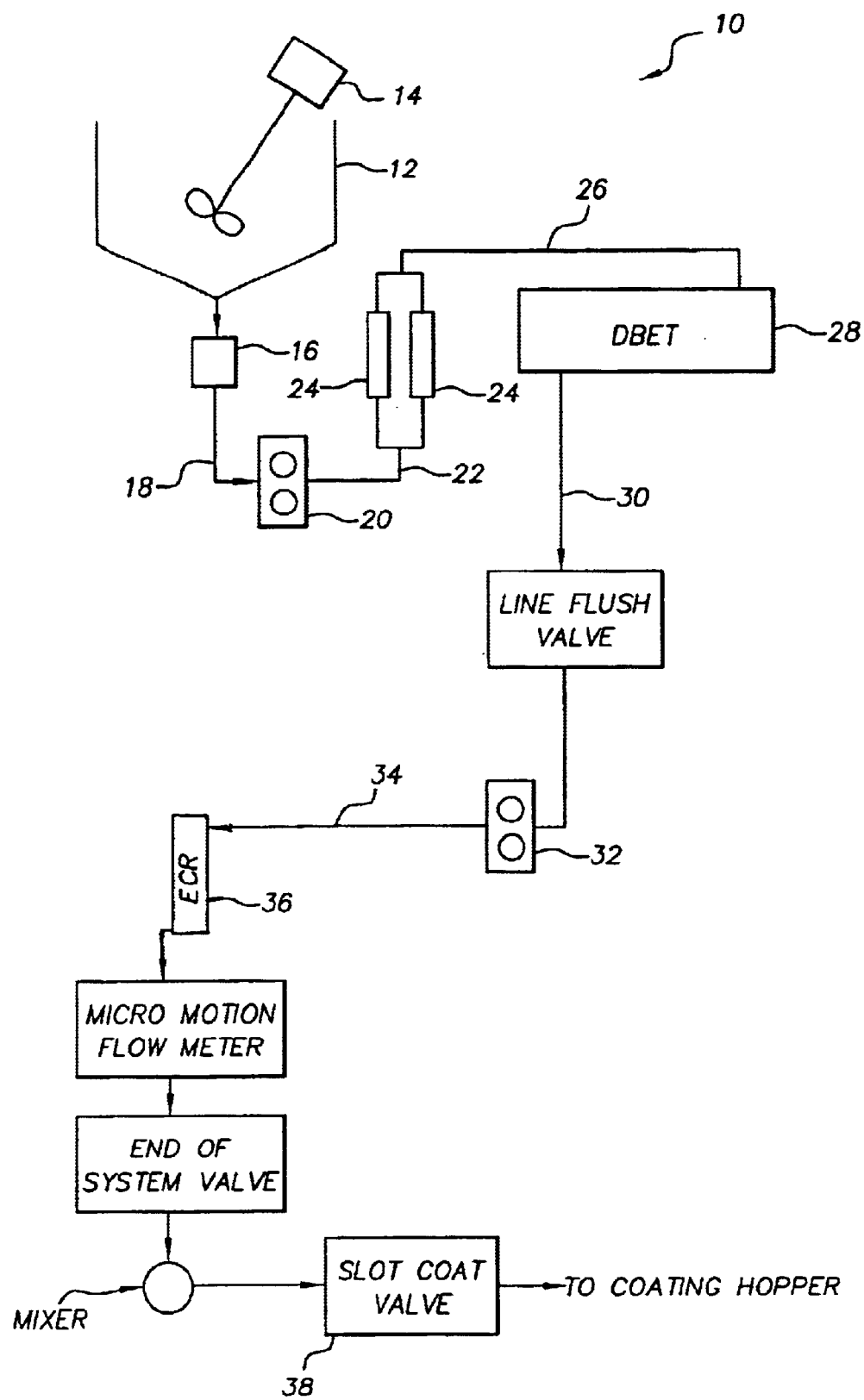
FIG. 1 is a schematic flow diagram showing an exemplary coating solution delivery system having the components incorporated therein to practice the staged deaeration method of the present invention.

Turning first to FIG. 1 there is shown an exemplary coating solution delivery system 10 incorporating the staged deaeration method of the present invention. The typical solution delivery system includes at least one tank or melt kettle 12, generally open to atmosphere. The tank or melt kettle 12 will typically have a mixing device 14 such as motor driven impeller. Coating solution from melt kettle 12 flows through a kettle select valve 16 enabling selection from between two or more kettles 12 such that coating solution source for the downstream coating operation can be switched from a first kettle 12 to a second kettle (not shown). From kettle select valve 16, coating solution flows through conduit 18 to pump 20. Pump 20 pumps the coating solution through conduit 22, filters 24, conduit 26, and into bubble elimination tube (BET) 28. An exemplary bubble elimination tube 28 (shown in detail in FIG. 2) is taught in pending. U.S. application, Ser. No. 09/969,073 filed Oct. 2, 2001 entitled "Bubble Elimination Tube with Acutely Angled Transducer Horn Assembly" which is hereby incorporated herein by reference. Preferably, the bubble elimination tube 28 will include at least one and, most preferably, at least two ultrasonic horns (not shown).

Coating solution flows from bubble elimination tube 28 through conduit 30 to metering pump 32. Metering pump 32 delivers a controlled flow of coating solution through conduit 34 to ECR 36. An exemplary ECR 36 (see FIG. 3) is taught in U.S. application Ser. No. 09/950,487 filed Sep. 11, 2001 now U.S. Pat. No. 6,576,042, entitled "A Process Control Method to Increase Deaeration Capacity in an ECR by Constant Voltage Operation" hereby incorporated herein by reference. From the ECR 36, coating solution is ultimately delivered to a downstream coating apparatus (not shown) via a slot coat valve 38. A preferred slot coat valve is taught in co-pending U.S. application Ser. No. 09/996,653 entitled "Purgable Multiport Valve" filed Nov. 28, 2001 hereby incorporated herein by reference.

Figure 2:
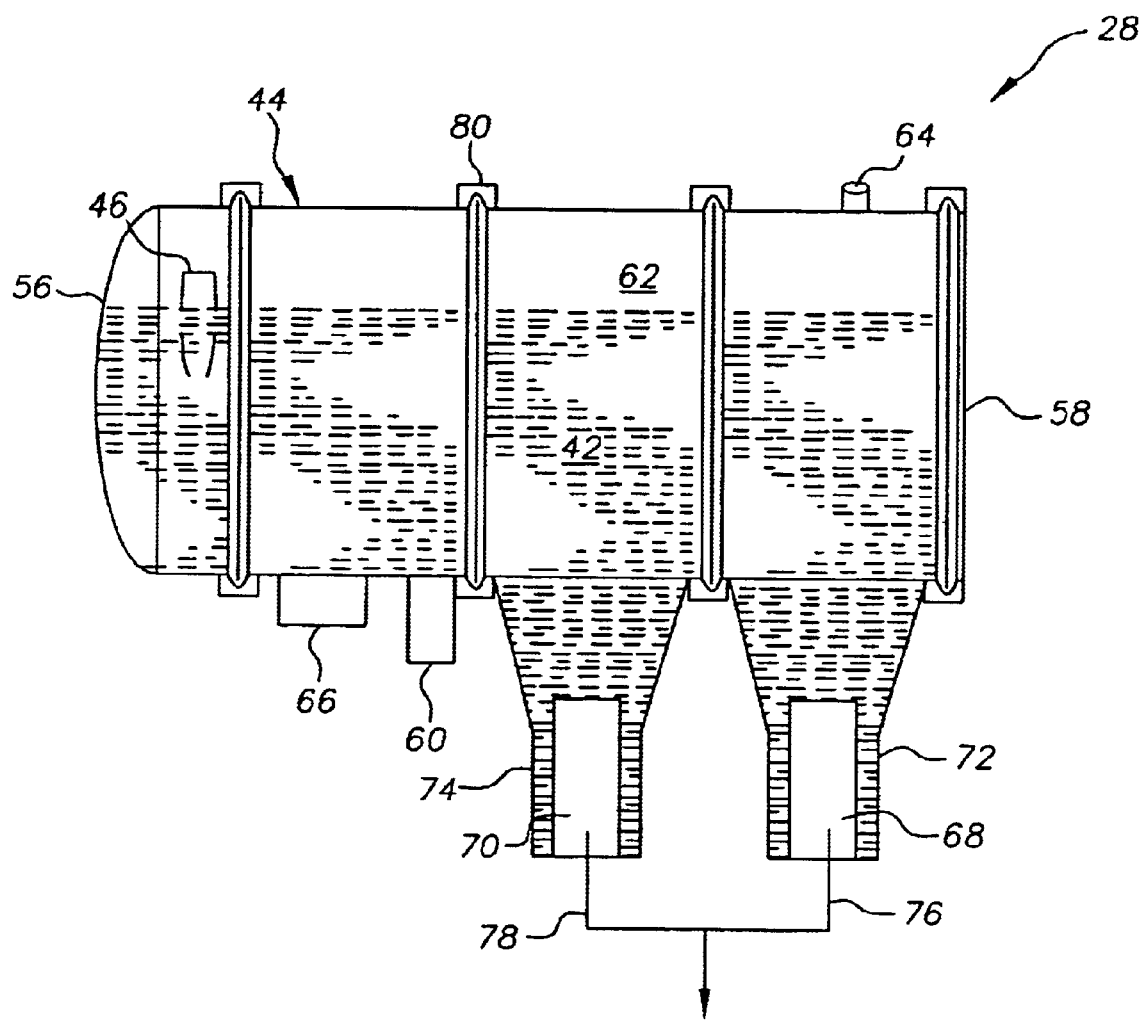
FIG. 2 is a side-view schematic of the de-bubbling apparatus of the present invention.

Looking next at FIG. 2, a side-view schematic of an exemplary bubble elimination tube 28 that can be used in the practice of the present invention is shown. A liquid 42, for example a photographic solution, would be delivered from a holding tank to a horizontal tubular or drum-like vessel 44 through the inlet 46. Vessel 44 includes a back plate 56 and a front plate 58. The liquid solution 42 would fill to a predetermined set level, as controlled by a pressure transducer 60 at the base of the vessel 44. The liquid solution 42 would occupy a portion of the chamber within the vessel 44 thereby defining an air space 62 within the vessel 44 above the liquid solution 42 which is preferably maintained at atmospheric pressure by means of a vent 64 open to atmosphere. There is also a drain valve 66 in at least one of the segments of vessel 44. Drainage valve 66 placed at the base of the tubular vessel prevents any accumulation of fluid during cleaning sequences and changeover to alternative solutions, thereby greatly reducing possible contamination problems.

The exemplary bubble elimination tube 28 shown in FIG. 2 includes two ultrasonic transducers 68, 70 situated in wells 72, 74, respectively. As shown in FIG. 2, the transducers 68 and 70 are entirely located in the wells 72 and 74 and do not extend into the vessel 44. Each of these transducers 68, 70 is connected to a power supply (not shown) such that acoustic waves can be emitted into the liquid solution 42 in the wells 72, 74. The liquid solution 42 travels through vessel 44 down into wells 72, 74 and out exit ports 76, 78 located near the bases of wells 72, 74.

Figure 3:
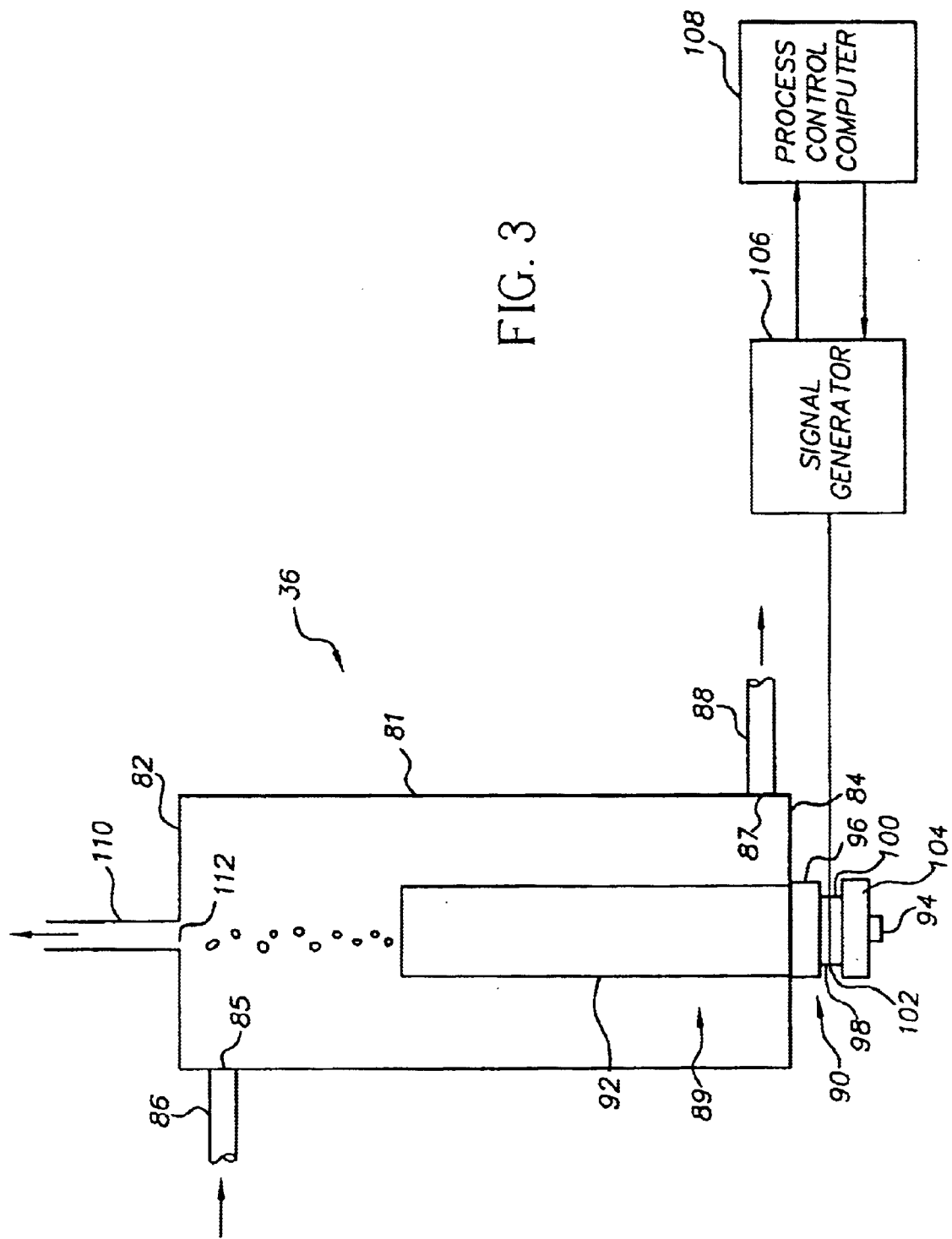
FIG. 3 is a schematic drawing of an exemplary ECR that may be used in the practice of the method of the present invention.

Turning next to FIG. 3, there is schematically depicted an exemplary ECR 36 that may be used in the practice of the method of the present invention. The ECR 36 comprises a generally cylindrical vessel 81 arranged such that its longitudinal axis is vertically oriented, the vessel 81 being closed at the top and bottom by respective upper and lower end walls 82, 84. There is an inlet port 85 from which a horizontal inlet pipe or conduit 86 extends generally tangentially with respect to the cylindrical wall of the vessel 81. Thus, the longitudinal axis of the inlet conduit 86 is substantially offset laterally with respect to the vertical central axis of the vessel 81. There is an outlet port 87 from which a horizontal outlet conduit 88 extends substantially tangentially with respect to the cylindrical wall of the vessel 81. It will be appreciated that with inlet port 85 and outlet port 87 both being positioned to tangentially intercept the cylindrical wall of the vessel 81, the supply of liquid to the vessel 81, via the inlet conduit 86 at any appreciable rate, will result in the liquid within the vessel 81 having a spin imparted thereto. That is to say, given a net flow from the inlet conduit 86 to the outlet conduit 88 through the vessel 81, the liquid proceeds in a spiraling movement from the upper to the lower end of the vessel 81. As illustrated, the disposition of the outlet conduit 88 with respect to the spin induced by the supply of liquid via the inlet conduit 86 is such that the liquid in the vessel 81 in the region of the outlet port 87 has a substantial component of motion along the axis of the outlet conduit 88 in the direction of the discharge through the outlet conduit 18 and thus tends to maintain the spin of liquid within the vessel 81. However, the orientation of the outlet conduit 88 is not of great importance and it may extend radially or in any other direction.

A device 89 is provided for propagating an ultrasonic beam axially within the vessel 81. The device 89 comprises a transducer portion 90 below end wall 84 and an ultrasound-conducting and propagating member 92 of solid cylindrical form in the present embodiment but referred to herein, for convenience, as a "horn", extending axially within the vessel from the bottom end wall 84. The horn 92 may, for example, comprise a cylindrical metal bar of predetermined length having a flat upper end face perpendicular to the common axis of horn 92 and the vessel 81. The horn 92 has a screw-threaded axial passage (not shown) extending from its lower end for receiving a securing bolt 94 (the head of which is visible in FIG. 3), passed through a central hole in the lower end wall 84, and passing through an axial passage provided in the stack of components forming the transducer portion 90. The bottom end wall 84 is thus clamped by the bolt 94 between the lower end face of the horn 92 and the transducer portion 90, whereby the aperture in the end wall 84 is sealed against passage of liquid or air and the device 89 is mechanically secured to the end wall 84. The transducer 90 is based upon the Langevin sandwich and comprises a first annular end mass 96 below the lower end wall 84, a first annular piezoelectric crystal 98 below end mass 96, an annular contact plate 102 disposed between piezoelectric crystal 98 and a second annular piezoelectric crystal 100 matched with piezoelectric crystal 98 and a second annular end mass 104 disposed below piezoelectric crystal 100. It should be understood that Supplemental Pair(s) of piezoelectric crystals can be added to the stack to yield more than one transducer. The contact plate 102 is electrically connected to a tunable RF signal generator 106 providing an a.c. electrical signal (e.g. of 40 kHz). The ultrasonic signal generator 106 may be controlled by an optional process control computer 108. The horn 92 and the components of the transducer portion 90 are selected and dimensioned to afford efficient conversion of electrical energy supplied to the transducer portion 90 to ultrasonic energy propagated upwardly, axially in the vessel 81 from the flat upper end face of the horn 92 at the selected ultrasonic operating frequency of the device. The end wall 84 is constructed as a flexible metal diaphragm (typically corrugated) to accommodate ultrasonic vibrations in the vertical sense imparted to the lower face of the horn 92 and thus to the central portion of the wall 84 by the transducer portion 90. A vent purge conduit 110 extends axially from an outlet vent purge port 112 located centrally in the top end wall 82 of the vessel 81.

In the practice of the method of the present invention, primary deaeration is conducted in two stages. First, large bubbles (200–300+ microns) and high levels of entrained air (0.1 to 1 percent by volume) are removed. This is accomplished by holding the solution at coating temperature for an hour or so in an open tank or kettle 12 with minimal agitation. Alternatively, the hold time in tank or kettle 12 can be reduced to about fifteen (15) prior to coating start-up. In such a case, bubbles will continue to rise in through the coating solution in the tank or kettle 12 as coating solution is taken from the tank or kettle 12. With moderate coating speeds, the level of coating solution in the tank or kettle 12 will not fall faster than the rate at which the bubbles are rising through the coating solution therein. Mixer speeds can be optimized with level and hold time. Optimization of these factors can be determined empirically. The large bubbles (500+ microns) present in the tank or kettle 12 rapidly rise out of coating solution and vent to atmosphere. With slow agitation, the surface of the solution is turned over and bubble removal is enhanced. Typically at the end of an hour, the level of air in solution is less than 0.5% and bubbles greater than 500+ microns have been removed.

The second stage of primary deaeration is accomplished in the smaller Bubble Elimination Tube (BET) 28. The BET 28 is typically a 6 or 8 inch diameter horizontal cylinder that is filled to 60% of its capacity with coating solution. Solution enters one end of the tube and exits the bottom of the other end of the tube after the solution has been "treated" for bubbles. The treatment may consist of simple buoyancy (no ultrasonic horn), or the solution may be treated with one or two ultrasonic horns to aid in bubble rise. The treatment depends on the amount of air in the solution as well as the flow rate and viscosity of the coating solution. The BET 28 is effective such that the entrained air remaining in the coating solution leaving the BET 28 is typically less than 0.05 percent by volume and bubbles remaining in the coating solution are not larger than 200 $\mu$m. Operation of the BET may be optimized by known methods such as, for example, varying the volume of the BET 28, varying the power levels at which the ultrasonic horns of the BET 28 are operated, or varying the number of ultrasonic horns in the BET 28.

After the second stage of primary deaeration, secondary deaeration is conducted in the ECR 36. As mentioned above, the ECR is typically a vertical 3-inch diameter cylinder. Solution enters the top and passes another ultrasonic horn therein (not shown) before it exits the bottom of the ECR 36. Two processes occur in the ECR. First, the ultrasonic horn forces bubbles to the top of the housing cylinder. Second, bubbles are dissolved into solution under pressure and effectively removed from solution. Since the bubbles are very small and few in number at this point, they typically stay dissolved in the coating solution through the coating process. Dissolved gases are not an issue. Coating solution exiting the ECR 36 has negligible entrained air and contains bubbles that are too small (less than 30 microns) to effectively measure. Operation of the ECR can be optimized by taking into account factors such as the volume of the ECR 36, the power levels at which the ultrasonic horn of the ECR 36 is operated, or the pressure at which the ECR 36 is operated. Preferably, the ECR 36 is operated at constant voltage as taught in U.S. application Ser. No. 09/950,481.

Figure 4:
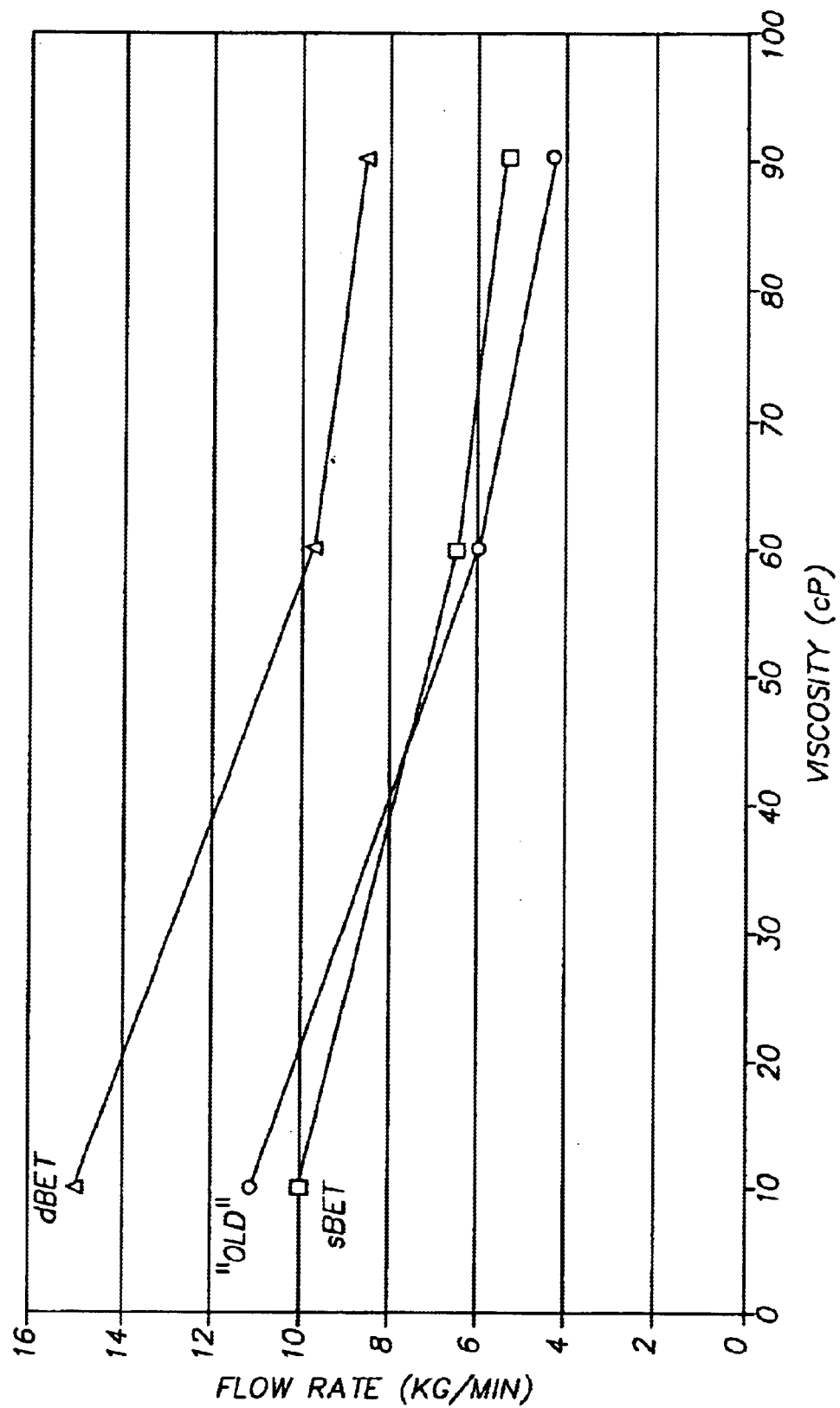
FIG. 4 shows deaeration capacity curves plotting flow rate versus coating solution viscosity for a prior art two horn BET deaeration system and method; a staged deaeration method according to the present invention incorporating single horn BET, and a staged deaeration method according to the present invention incorporating an integrated two horn BET.

By using the three different deaeration devices in a sequential or staged manner, deaeration is optimized over prior art methods. Overall deaeration of the coating solution is enhanced without increases in liquid waste or capital cost. FIG. 4 shows deaeration capacity curves plotting flow rate versus coating solution viscosity for a prior art two-horn BET deaeration system and method, a staged deaeration method according to the present invention incorporating single horn BET, and a staged deaeration method according to the present invention incorporating an integrated two-horn BET. From this it can be seen that deaeration capacity can typically be increased by 50 to 100% depending on operating conditions.

From the foregoing, it will be seen that this invention is one well adapted to obtain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List

10 coating solution delivery system
12 tank or melt kettle
14 mixing device
16 kettle select valve
18 conduit
20 pump
22 conduit
24 filters
26 conduit
28 Bubble Elimination Tube (BET)
30 conduit
32 metering pump
34 conduit
36 ECR
38 slot coat valve
42 liquid
44 drum-like vessel
46 inlet
56 back plate
58 front plate
60 pressure transducer
62 air space
64 vent
66 drain valve
68 ultrasonic transducers
70 ultrasonic transducers
72 wells
74 wells
76 exit ports
78 exit ports
81 cylindrical vessel
82 upper end wall
84 lower end wall
85 inlet port
86 inlet pipe or conduit
87 outlet port
88 outlet conduit
89 device
90 transducer portion
92 horn
94 securing bolt
96 annular end mass
98 piezoelectric crystal
100 $2^{nd}$ annular piezoelectric crystal
102 annual contact plate
104 $2^{nd}$ annular end mass
106 RF signal generator
108 process control computer
110 vent purge conduit
112 outlet vent purge port

What is claimed is:

1. A method of removing bubbles from a coating solution prior to a coating operation comprising the steps of:
   (a) debubbling the coating solution in a tank open to atmosphere to remove bubbles having a diameter in the range of from about 200 to 300 μm and greater therefrom;
   (b) flowing the coating solution from the tank to a bubble elimination tube, the bubble elimination tube including a vessel having a well extending therefrom and an ultrasonic transducer situated in the well, the ultrasonic transducer being located entirely within the well and not extending into the vessel;
   (c) debubbling the coating solution in the bubble elimination tube to remove bubbles from the coating solution having a diameter greater than about 200 μm;
   (d) flowing the coating solution from the bubble elimination tube through an end cap round ultrasonic bubble eliminator, the end cap round ultrasonic bubble eliminator removing remaining bubbles in the coating solution having a diameter greater than about 30 μm; and
   (e) delivering the coating solution from the end cap round ultrasonic bubble eliminator to the downstream coating operation.

2. A method as recited in claim 1 further comprising the step of:
   slowly agitating the coating solution in the tank.

3. A method as recited in claim 1 further comprising the step of:
   holding the coating solution in the tank at a coating temperature during the step of debubbling the coating solution in the tank.

4. A method as recited in claim 1 further comprising the steps of:
   (a) forcing a portion of the bubbles in the coating solution to a top portion of the end cap round ultrasonic bubble eliminator; and
   (b) dissolving under pressure a portion of the bubbles in the coating solution in the end cap round ultrasonic bubble eliminator.

* * * * *